(12) United States Patent
Millar

(10) Patent No.: US 7,091,472 B1
(45) Date of Patent: Aug. 15, 2006

(54) SENSOR INTERFACE

(75) Inventor: Richard C. Millar, Lexington Park, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 114 days.

(21) Appl. No.: 10/956,594

(22) Filed: Sep. 30, 2004

(51) Int. Cl.
*G01J 1/04* (2006.01)
*G02B 6/00* (2006.01)

(52) U.S. Cl. .......................... 250/227.14; 250/227.16; 385/13; 356/73.1

(58) Field of Classification Search ................ 250/227.14–227.16, 227.18; 385/10, 12, 385/13; 356/32, 73.1
See application file for complete search history.

(56) References Cited

U.S. PATENT DOCUMENTS

| 6,677,576 B1 | 1/2004 | Kenny et al. |
| 6,751,367 B1 | 6/2004 | Moslehi et al. |

2002/0196993 A1* 12/2002 Schroeder .................. 385/12

OTHER PUBLICATIONS

M. Wippich, K.L. Dessau, Tunable Lasers and Fiber-Bragg-Grating Sensors, The Industrial Physicist, p. 24, Jun./Jul. 2003, American Institute of Physics.
B.D. Johnson, Fiber Bragg Gratings Track Fatigue in Aircraft, Accent on Applications, May 2003, http://www.photonics.com/spectra/applications.
Eric Glauber, EE-566 Presentation, Topic: Fiber Bragg Gratings, Oct. 29, 2003, University of Buffalo Lecture.

* cited by examiner

*Primary Examiner*—Kevin Pyo
(74) *Attorney, Agent, or Firm*—Mark O. Glut

(57) ABSTRACT

The sensor interface includes a sensor, an optical fiber, a Bragg grating disposed on the optical fiber, and an optoelectronic circuit. The sensor communicates with the Bragg grating such that the sensor imposes a strain on the Bragg grating that is a function of the parameter sensed. The optoelectronic circuit reads the sensor by interrogating the Bragg grating with a light pulse carried by the optical fiber and detecting the timing and/or frequency of the light reflected by the Bragg grating. The timing and/or frequency of the light reflected is a function of the strain imposed on the Bragg grating.

11 Claims, 2 Drawing Sheets

SENSOR INTERFACE

STATEMENT OF GOVERNMENT INTEREST

The invention described herein may be manufactured and used by or for the Government of the United States of America for governmental purposes without payment of any royalties thereon or therefor.

BACKGROUND

The present invention relates to a sensor interface. More specifically, but without limitation, the present invention relates to an open system sensor interface using Bragg gratings and optical fiber.

Existing instrumentation and control systems use electrical interfaces and wiring harnesses to drive and acquire signals from sensors. Each sensor usually has unique electrical interface characteristics that in turn require tailored analog electrical interface circuitry in the associated electronic device (typically a display, recorder or control unit). This increases life cycle cost and impedes initial development and later changes to sensor configurations.

One solution often used to solve this problem is utilizing a standard electronic data bus that is connected to multiple sensors equipped with embedded data bus interfaces. This enables flexible application and connection of sensors to electronic controls with only software changes to accommodate different sensor arrangements. However, the embedded data bus interface electronics add costs and may be impracticable for sensors located in severe environments, particularly for any sensors used in military applications such as, but without limitation, a propulsion system.

Thus, there is a need in the art to provide a sensor interface that incorporates the listed benefits without the limitations inherent in present methods.

SUMMARY

The present invention is directed to a sensor interface. The sensor interface includes a sensor, an optical fiber, a Bragg grating disposed on the optical fiber, and an optoelectronic circuit. The sensor communicates with the Bragg grating such that the sensor imposes a strain on the Bragg grating that is a function of the parameter sensed. The optoelectronic circuit reads the sensor by interrogating the Bragg grating with a light pulse carried by the optical fiber and detecting the timing and/or frequency of the light reflected by the Bragg grating. The timing and/or frequency of the light reflected is a function of the strain imposed on the Bragg grating.

A feature of the invention is an improved sensor interface that offers improved durability and reliability when exposed to a hot thermal environment, especially a propulsion system.

It is another feature of the invention to provide a sensor interface that has a reduced sensitivity to electromagnetic interference. It is also a feature of the invention to provide a sensor interface that offers lower electronic circuitry complexity and cost.

It is a feature of the invention to provide a sensor interface that simplifies sensor interface of electronic controls and data acquisition systems, while reducing cost, weight, volume, and improving reliability.

BRIEF DESCRIPTION OF THE DRAWINGS

These and other features, aspects and advantages of the present invention will become better understood with reference to the following description and appended claims, and accompanying drawings wherein:

DETAILED DESCRIPTION OF THE INVENTION

Figure 1:
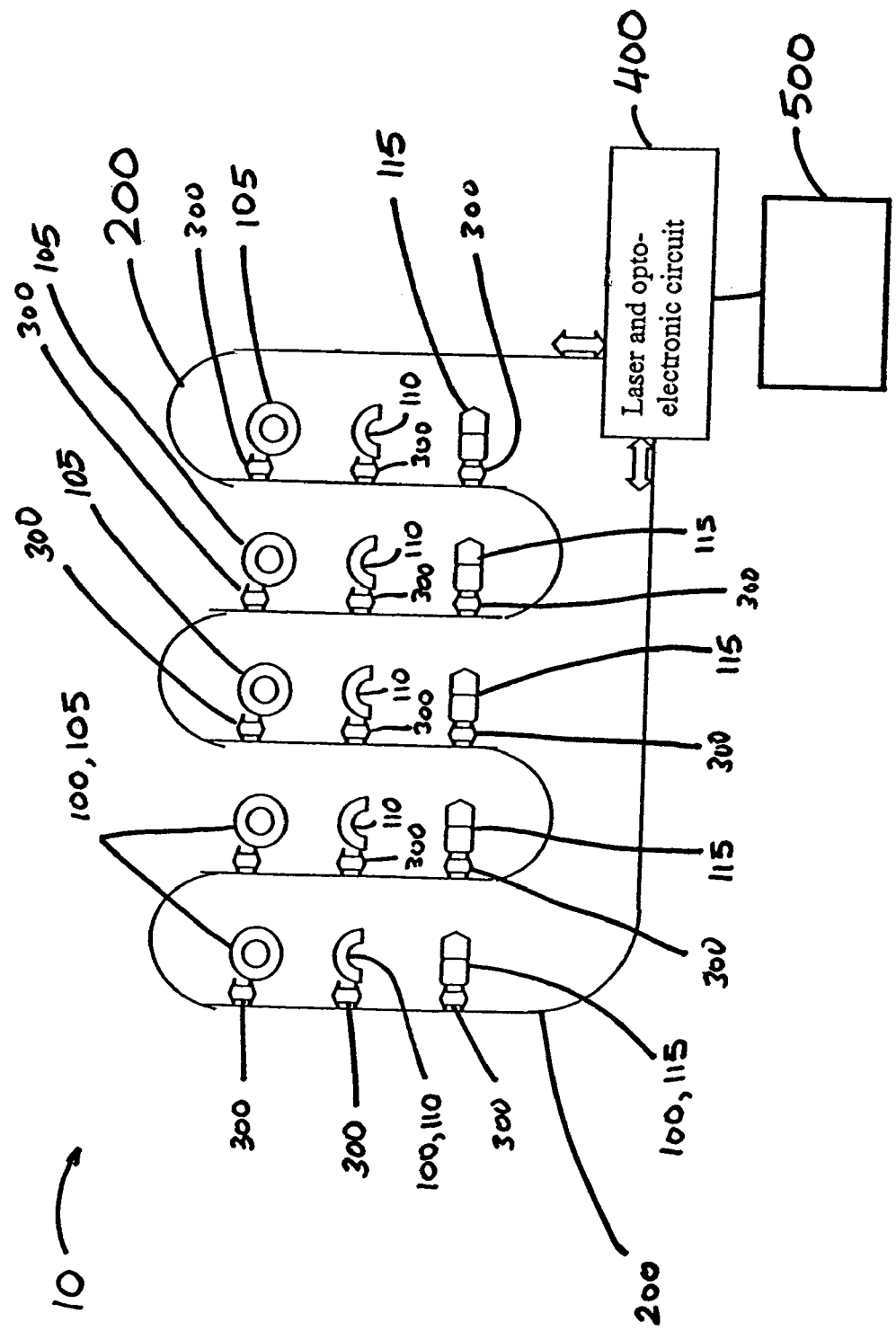
FIG. 1 is a schematic illustration of an embodiment of the sensor interface.
Figure 2:
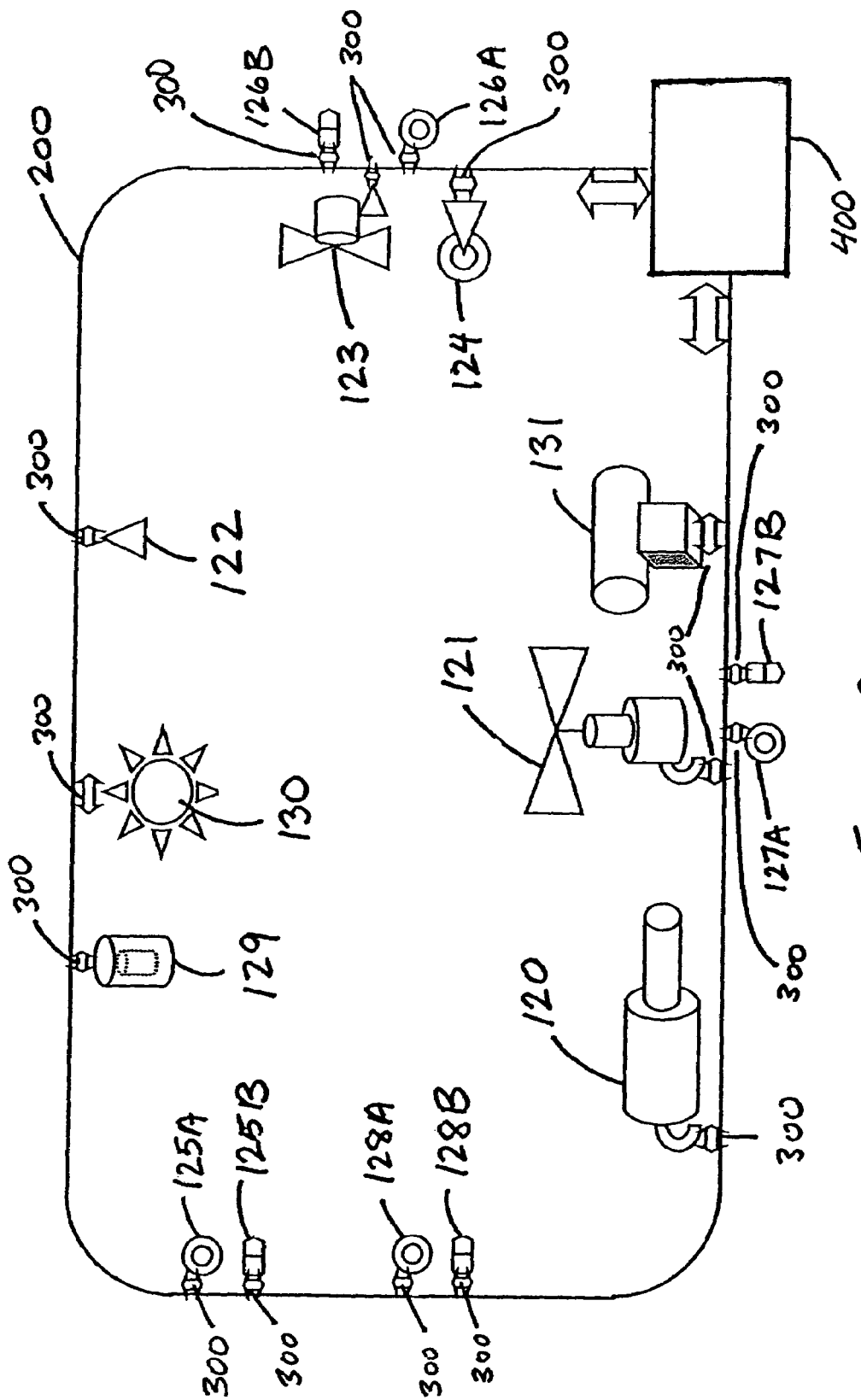
FIG. 2 is a schematic illustration of an embodiment of the sensor interface utilized in a propulsion system.

The preferred embodiments of the present invention are illustrated by way of example below and in FIGS. 1 and 2. As seen in FIG. 1, the sensor interface 10 includes a sensor 100, an optical fiber 200, a Bragg grating 300 disposed on the optical fiber 200, and an optoelectronic signal acquisition circuit 400. The sensor 100 mechanically applies a strain to the Bragg grating 300. The strain applied is a function of the parameter sensed. The optoelectronic circuit 400 reads the sensor 100 by interrogating the Bragg grating 300 with a light pulse carried by the optical fiber 200 and detecting the timing and/or frequency of the light reflected by the Bragg grating 300. The timing and/or frequency of the light reflected is a function of the strain imposed on the Bragg grating 300. The sensor reading is then made available for display, recording and processing for monitoring and control in any suitable analog or digital electronic format.

In the discussion of the present invention, the system will be discussed in a propulsion system environment, specifically a propulsion system in a military aircraft environment; however, the system can also be utilized in any other type of environment that utilizes sensors.

A sensor 100 may be defined, but without limitation, as a component that converts mechanical energy into an electrical signal or an optical (photonic) signal and/or as an information pickup device. The sensor 100 utilized may be, but without limitation, a pressure sensor 105, a position sensor 110, a temperature sensor 115, an acceleration sensor, an electric field sensor, a magnetic field sensor, or any other type of sensor. These sensors 100, but without limitation, may be utilized individually, in a group or in any possible combination. In the preferred embodiment, the sensor interface 10 may have one or more sensors 100. The preferred type of sensor 100 is a passive type sensor. A passive sensor may be defined, but without limitation, as a sensor not requiring electrical power and a sensor without embedded electronic circuitry.

Propulsion control and monitoring systems typically, but without limitation, incorporate the following types of sensors: position feedback sensors incorporated in an actuator 120 or other effectors (including fuel metering unit valves 121); an on/off switch indication 122 (including indications incorporated in solenoid operated devices 123 and pressure switches 124); inlet pressure 125A; inlet temperature 125B; gas path pressure 126A; gas path temperature 126B; fuel pressure 127A; fuel temperature 127B; oil differential pressure 128A; oil temperature 128B; engine vibration 129; shaft rpm 130; and fuel flow 131. FIG. 2 shows an embodiment of the invention that may be utilized in a propulsion system.

An optical fiber 200 may be defined, but without limitation, as a transmission medium associated with the transmission of information as light pulses along a glass or plastic wire or fiber, often encoded by frequency of the light transmitted. The glass or plastic fiber is generally made with graduations in its properties, radially and longitudinally, and/or with a central void or fluid filled core, to limit the attenuation of the signal and allow amplification, modulation and/or other changes to the character of the optical signals transmitted via the optical fiber 200. A Bragg grating 300 may be incorporated in the optical fiber 200 by appropriate manipulation of the fiber's properties, which can be done by, but without limitation, varying concentration of chemical dopants.

A Bragg grating 300 may be defined, but without limitation, as an apparatus that can reflect a predetermined narrow or broad range of wavelengths of light incident on the grating, while passing all other wavelengths of light. In general, the wavelength of the reflected light is a function of the strain, the linear extension or contraction, imposed on a Bragg grating 300 by externally applied forces, such as by a sensor 100 and the temperature of the material of the Bragg grating 300. In an embodiment of the invention that includes more than one sensor, as seen in FIGS. 1 and 2, each sensor 100 has a corresponding Bragg grating 300.

The optoelectronic signal acquisition circuit 400 or optoelectronic circuit may be defined, but without limitation, as an apparatus that illuminates the optical fiber 200 with light of a frequency that varies to sweep the range of frequencies of all the Bragg gratings 300 disposed along the fiber and which detects the reflection of the illumination. The preferred type of optoelectronic signal acquisition circuit 400 is a laser and optoelectronic circuit. The optoelectronic circuit 400 determines the frequency of the light reflected by each Bragg grating 300 disposed along the optical fiber 200, which encodes the corresponding level of strain and thus the reading of the associated sensor.

In operation, a sensor 100 obtains a reading, which in turn creates a proportional strain in the corresponding Bragg grating 300. The optoelectronic signal acquisition circuit 400 reads the applied strain by illuminating the Bragg grating 300 via the optical fiber 200 with a pulse of laser light of an appropriate range of wavelengths. The Bragg grating 300 reflects a portion of the laser pulse back to the source. The wavelength of the reflected light is determined by the level of strain applied to the Bragg grating 300. This information is sent back along the optical fiber 200 to a remote electronic unit 500, which can incorporate the optoelectronic circuit 400. The remote electronic unit 500 may be a control unit or a data bus node that allows communication with the relevant aircraft system. The wavelength and timing of the reflected light is detected by the optoelectronic circuit 400 and converted to an analog or digital electronic output (or any other convenient format) that shows usable information such as temperature, position, or pressure, etc. Responses from different Bragg gratings 300 are differentiated by the variation in the time delay between the laser pulse and reflections from Bragg gratings 300 at different distances along the optical fiber 200, and/or by assigning different ranges of wavelength of the reflected light from the Bragg gratings 300 applied to different sensors 100. The remote electronic unit 500 then converts the wavelengths of the reflected light into usable information such as temperature, position, or pressure, etc. This information is then passed on to the user or pilot.

The sensor interface 10 allows for the standardization of the frequencies of the Bragg gratings 300, and their range of variation, and the gratings' disposition on the optical fiber 200 such that a common optoelectronic circuit can interrogate any assemblage of optical fiber 200 and sensors 100 with standardized Bragg gratings 300. The identity of any sensor 100 corresponds to a standard range of frequency bands assigned to the associated or corresponding Bragg grating 300 and/or its location along the optical fiber 200. Each sensor 100 is designed to impose a strain and/or temperature to the corresponding Bragg grating 300 in a predetermined relationship to the sensed parameter, resulting in a calibrated relationship between the frequency of light reflected, within the band assigned to the Bragg grating 300 and the sensed parameter or sensor reading. Thus, any type of sensor 100 can be assigned to a specific frequency and/or position on the optical fiber 200 with no other physical modification to the sensor system.

The encoded sensor identification and sensor reading is reconstituted in the processing of the output of the optoelectronic signal acquisition circuit 400. Typically, but without limitation, this reconstitution may normally be performed as a software operation. The result is that standardized sensor/optical fiber assemblies and individual standardized sensors can be replaced with others and only data tables and/or software changes are required to accommodate the change.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A sensor interface, comprising:
    a passive type sensor, the sensor being able to sense a particular parameter in a propulsion system;
    an optical fiber;
    a Bragg grating incorporated in the optical fiber, the sensor communicates with the Bragg grating such that the sensor imposes a strain on the Bragg grating that is a function of the parameter sensed; and
    an optoelectronic circuit, the optoelectronic circuit reads the sensor by interrogating the Bragg grating with a light pulse carried by the optical fiber and detecting the timing and/or frequency of light reflected by the Bragg grating, the timing and/or frequency of the reflected light is a function of the strain imposed on the Bragg grating.

2. The sensor interface of claim 1, wherein the sensor interface further comprising a remote electronic unit the remote electronic unit communicating with the optical fiber such that the remote electronic unit converts wavelengths of light into usable information on the sensed parameter.

3. A sensor interface, comprising:
    a pressure sensor;
    a position sensor, the pressure sensor and the position sensor being passive type sensors and able to operate in a propulsion system;
    an optical fiber;
    at least two Bragg gratings spaced along the optical fiber, the at least two Bragg gratings having distinct characteristic and standardized frequency ranges, the pressure sensor communicating with a corresponding Bragg grating such that the pressure sensor imposes a strain on the corresponding Bragg grating that is a function of the pressure sensed, the position sensor communicating with another of the Bragg gratings such that the position sensor imposes a strain on the corresponding Bragg grating that is a function of the position sensed; and an optoelectronic circuit, the optoelectronic circuit reads the pressure sensor and the position sensor by interrogating the corresponding Bragg gratings with a light pulse carried by the optical fiber and detecting the timing and/or frequency of the light reflected by the corresponding Bragg gratings, the timing and/or frequency of the reflected light is a function of the strain imposed on the Bragg gratings.

4. The sensor interface of claim 3, wherein the sensor interface further comprising a temperature sensor, the temperature sensor communicating with a corresponding Bragg grating such that the temperature sensor imposes a strain on the Bragg grating that is a function of the temperature sensed, the corresponding Bragg grating spaced along the optical fiber.

5. The sensor interface of claim 3, wherein the optical fiber is manufactured from a group of materials consisting of glass and plastic.

6. The sensor interface of claim 3, wherein the optical fiber is encoded by frequency of the light transmitted.

7. The sensor interface of claim 3, wherein the optical fiber has a central void.

8. The sensor interface of claim 3, wherein the optical fiber has a fluid filled core.

9. The sensor interface of claim 3, wherein the sensor interface further comprising a remote electronic unit, the remote electronic unit communicating with the optical fiber such that the remote electronic unit converts wavelengths of light into usable information.

10. A sensor interface, comprising:

a plurality of passive type sensors, each sensor being able to sense a particular parameter in a propulsion system;

an optical fiber;

a plurality of Bragg gratings, the Bragg gratings spaced along the optical fiber, each sensor communicating with a corresponding Bragg grating such that each sensor imposes a strain on the corresponding Bragg grating that is a function of the parameter sensed; and an optoelectronic circuit for reading each sensor by interrogating the Bragg gratings with a light pulse carried by the optical fiber and detecting the timing and/or frequency of the light reflected by each corresponding Bragg grating, the timing and/or frequency of the reflected light is a function of the strain imposed on the Bragg gratings.

11. The sensor interface of claim 10, wherein the sensor interface further comprises a remote electronic unit for communicating with the optical fiber such that the remote electronic unit converts wavelengths of light into usable information.

* * * * *